United States Patent
Bauer et al.

(10) Patent No.: US 6,644,919 B2
(45) Date of Patent: Nov. 11, 2003

(54) ROTOR BLADE WITH FLAP AND FLAP DRIVE

(75) Inventors: Markus Bauer, Munich (DE); Ulrich Denecke, Neubiberg (DE); Gerald Kuntze-Fechner, Waakirchen (DE); Christine Mueller, Munich (DE); Hermann Sahlstorfer, Munich (DE); Alois Wagner, Dietramszell (DE)

(73) Assignee: Eurocopter Deutschland GmbH, Donauwoerth (DE)

( * ) Notice: Subject to any disclaimer, the term of this patent is extended or adjusted under 35 U.S.C. 154(b) by 72 days.

(21) Appl. No.: 10/021,745

(22) Filed: Dec. 11, 2001

(65) Prior Publication Data

US 2002/0071767 A1 Jun. 13, 2002

(30) Foreign Application Priority Data

Dec. 11, 2000 (DE) .......................................... 100 61 636

(51) Int. Cl.[7] .............................................. B64C 11/28
(52) U.S. Cl. ....................................................... 416/23
(58) Field of Search ..................................... 416/23, 24

(56) References Cited

U.S. PATENT DOCUMENTS

| | | |
|---|---|---|
| 2,716,460 A | 8/1955 | Young |
| 4,514,143 A | 4/1985 | Campbell |
| 5,224,826 A | 7/1993 | Hall et al. |
| 5,409,183 A | 4/1995 | Gunsallus |
| 5,588,800 A | 12/1996 | Charles et al. |
| 5,639,215 A | 6/1997 | Yamakawa et al. |
| 6,152,692 A | 11/2000 | Aubry |
| 6,168,379 B1 | 1/2001 | Bauer |
| 6,231,013 B1 | 5/2001 | Jaenker |

FOREIGN PATENT DOCUMENTS

| | | |
|---|---|---|
| EP | 1035015 | 9/2000 |
| WO | WO 99/15401 | 4/1999 |
| WO | WO 02/12063 | 2/2002 |

OTHER PUBLICATIONS

Peter Jänker et al.; Article entitled ("Development of High-–Performing Piezoelectric Actuators for Transport Systems"), presented at "Actuator 98" Conference at Bremen Exposition, Bremen, Germany, Messe Bremen GmbH, Jun. 17–19, 1998, by Daimler–Benz AG Research and Technology.

Primary Examiner—Edward K. Look
Assistant Examiner—Kimya N McCoy
(74) Attorney, Agent, or Firm—W. F. Fasse; W. G. Fasse

(57) ABSTRACT

A rotor blade arrangement includes a rotor blade with a hollow blade chamber therein, and a flap module removably arranged and secured in the blade chamber. The flap module includes a module housing received in the blade chamber, an actuator arranged in the housing, a flap pivotably arranged at an edge of the housing, and a power transmission linkage connecting the actuator to the flap. The module housing is inserted through an opening into the blade chamber, so that the flap protrudes and forms a continuation of the aerodynamic contour of the blade. The flap may be a trailing edge flap at the trailing edge or a leading edge nose flap at the leading edge of the blade. The flap module does not change the center of gravity of the blade. The entire flap module can be easily removed from the blade for adjustment, inspection, maintenance, repair or replacement.

21 Claims, 8 Drawing Sheets

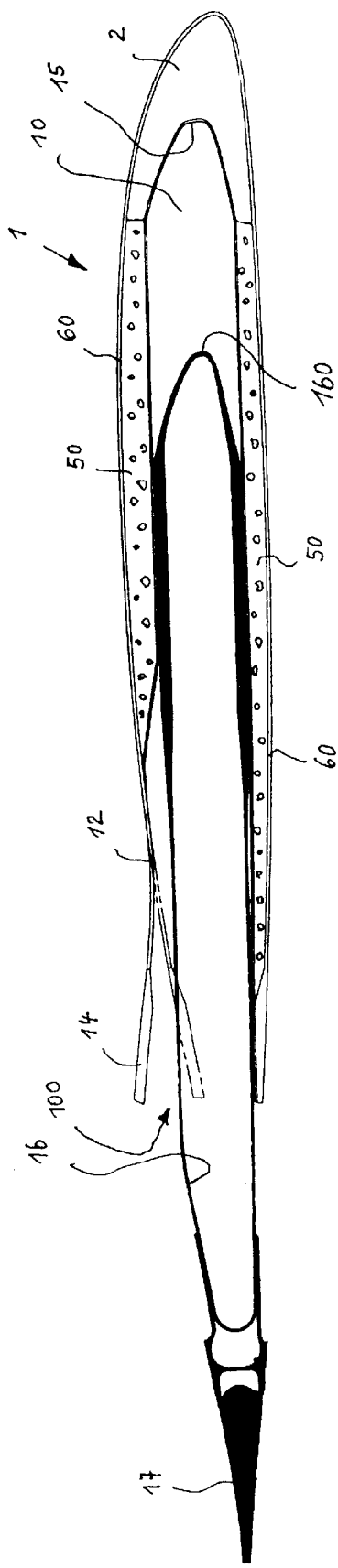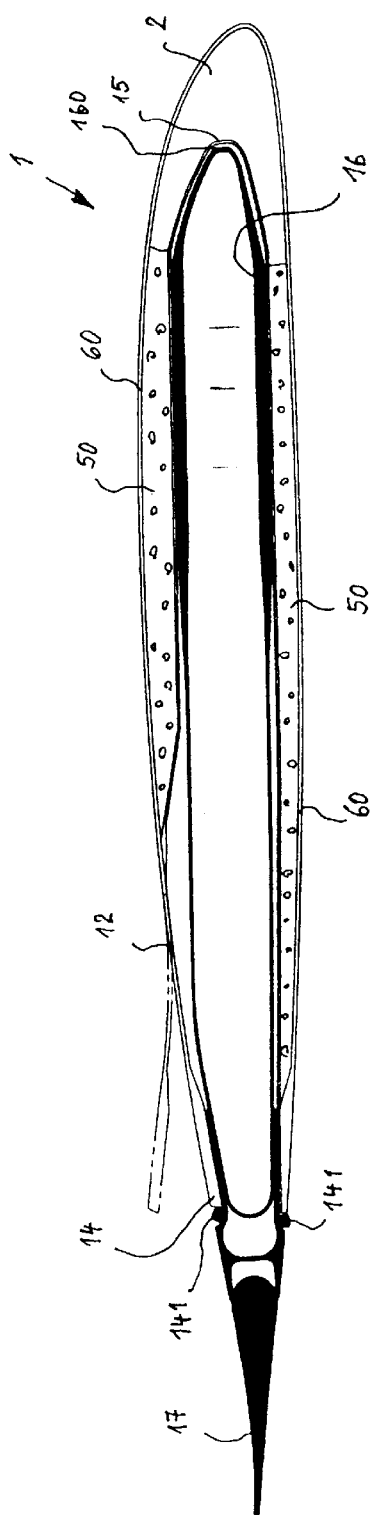
Fig. 4
Fig. 4a

ROTOR BLADE WITH FLAP AND FLAP DRIVE

PRIORITY CLAIM

This application is based on and claims the priority under 35 U.S.C. §119 of German Patent Application 100 61 636.4, filed on Dec. 11, 2000, the entire disclosure of which is incorporated herein by reference.

FIELD OF THE INVENTION

The invention relates to a rotor blade with a flap and a flap drive, wherein the lift-generating blade accommodates the flap drive with the flap, but the flap remains arranged outside the blade.

BACKGROUND INFORMATION

The rotor system of a helicopter is the cause of noise and vibrations in the cabin. At the same time the rotor system generates a high external noise level, particularly during the landing flight. These noise emissions and vibrations result in an extreme reduction in comfort for helicopter passengers and prove to be unfavorable to the environment. During the course of further helicopter construction developments, the aim is to reduce these noise emissions and vibrations.

In the case of the helicopters presently offered on the market with conventional rotor systems, the rotor blades are collectively and cyclically controlled via a swash plate and a mechanical connecting rod linkage. The idea of extending this primary rotor blade control by using a flap fitted in the blade tip area of the individual rotor blade is now generally accepted for reducing noise emissions and vibrations. This flap is intended to enable individual blade control. By using a controllable flap in the lift-generating blade area, preferably close to the blade tip and at the profile trailing edge of the blade, it is possible for the rotor blade to continuously adjust to the varying air flow conditions during a rotor blade rotation, thus allowing a reduction in noise emissions and vibrations via the rotor system.

Published European Patent Application EP 1,035,015 A2 describes a flap drive with a flap, which is installed in a rotor blade. The flap drive consists of an actuator, a movable hinged frame coupled with the actuator and from there, via a power transmission means, with a pivotably mounted flap. The actuator is fastened to the inner structure of the rotor blade and the blade is mounted in the rotor blade structure in such a way that it can pivot. During the manufacture of the rotor blade, the flap drive with the flap must be installed in the rotor blade at the same time.

In order to allow a visual inspection of the flap drive and to allow maintenance work to be performed, an opening will be left in the rotor blade shell, which can be closed with a cover. The opening in the rotor blade has a detrimental influence on the blade supporting structure. Structural properties such as bending rigidity and strength are detrimentally influenced by the penetration through the shell. The closing cover of the opening must be formed as a component of the supporting structure. That usually results in a detrimental change to the aerodynamic blade properties in the existing blade geometry. If, finally, the flap drive is closed within the blade, then it will be necessary to exchange the entire rotor blade due to any arising problems in the flap drive.

SUMMARY OF THE INVENTION

It is an object of the invention to structure the installation of a flap with a flap drive in a rotor blade in such a way, that the structure of the rotor blade is hardly influenced and still allows a rapid inspection of the serviceability of the flap, as well as its adjustment and maintenance. The invention further aims to overcome or avoid the disadvantages of the prior art, and to achieve additional advantages, as apparent from the present specification.

The above objects have been achieved in a rotor blade arrangement according to the invention. The lift-generating blade has a blade chamber formed in its structure, with an opening pointing in the direction of the trailing edge. When the rotor blade is at rest, and being initially manufactured, or later serviced or retro-fitted for example, at least one housing can be inserted through this opening into the blade chamber and then releasably fixed therein. The housing accommodates at least one flap drive and the flap. Alternatively, the blade chamber can be formed with an opening pointing in the direction of the leading edge nose. The housing there supports at least one leading edge flap or nose flap with a leading edge flap drive. The housing with its associated flap and flap drive form an exchangeable flap module that is removably and exchangeably secured in the blade chamber of the blade.

In the area of the outer skin or shell of the rotor blade, a flexible elastic bending cover is formed as a boundary to the blade chamber, the bending hinge axis of which is essentially guided lengthwise and parallel to the longitudinal blade axis. The bending cover can pivot or deflect from a resting position into an end position and back again. In this way the opening of the chamber can be enlarged in order to insert or remove the housing.

When inserting and removing the housing in the blade chamber, the blade chamber walls serve as a guide for the housing. Furthermore, the housing also supports a pre-tensioning means for the pre-tensioning of a flap drive piezoactuator.

The housing can be positioned in the blade chamber and fixed by a fastening means. Furthermore, the housing has a connecting means arranged therein for connecting relevant components (e.g. the actuator) in the housing with the power and information wires leading through the rotor blade.

The housing is positioned in the blade chamber of the rotor blade in such a way that the center of gravity of the profile cross-section of such a rotor blade is hardly altered in comparison with an original profile cross-section without the blade chamber. The center of gravity of the housing is arranged close to the leading edge spar in the housing interior.

The housing accommodated in the blade chamber supports seal elements or means, which allow the blade chamber opening to be sealed, thus avoiding the penetration of dust particles and humidity.

It is also possible to arrange plural individual housings next to each other on one plane in the direction of the longitudinal blade axis, in a blade chamber having appropriately large dimensions, thus allowing an increase in the effective flap length in the longitudinal direction of the blade.

The structure of the rotor blade is hardly influenced by the invention. The use of the flap module allows its rapid onsite inspection and also allows a rapid maintenance and adjustment of the flap drive and the flap. To accomplish this, the rotor blade does not even need to be removed from the rotor hub. If necessary, the flap module may simply be removed from the blade chamber and replaced with a different flap module, e.g. a new module or a module that has been repaired, upgraded or maintenance-serviced.

BRIEF DESCRIPTION OF THE DRAWINGS

In order that the invention may be clearly understood, it will now be described in connection with example embodiments, with reference to the accompanying drawings, wherein:

FIG. 4 is a cross-sectional view of a flap module with its housing being inserted into the blade chamber of the blade;

FIG. 4a is a view similar to FIG. 4, but showing the flap module housing fully inserted in the blade chamber until it stops;

DETAILED DESCRIPTION OF PREFERRED EXAMPLE EMBODIMENTS AND OF THE BEST MODE OF THE INVENTION

In the field of rotary wing aircraft such as helicopters, current rotor systems without hinges or bearings have rotor blades that are usually manufactured of fiber composite materials. The rotor blades are deflected in various directions during rotation and, in particular, placed under great strain by the centrifugal force. The structure of such a rotor blade is characterized by the fiber composite materials used.

The lift-generating blade is that section of the rotor blade having an airfoil shape that generates lift. The flap with the flap drive is arranged at this section of the blade. Particularly, a position close to the outboard blade tip is preferred. The flap may be a trailing edge flap oriented in the rearward direction of the trailing edge of the blade, so that the pointed flap end is essentially aligned with the trailing edge of the blade, or may be a leading edge flap or nose flap oriented in the forward direction along the leading edge of the blade.

Figure 1:
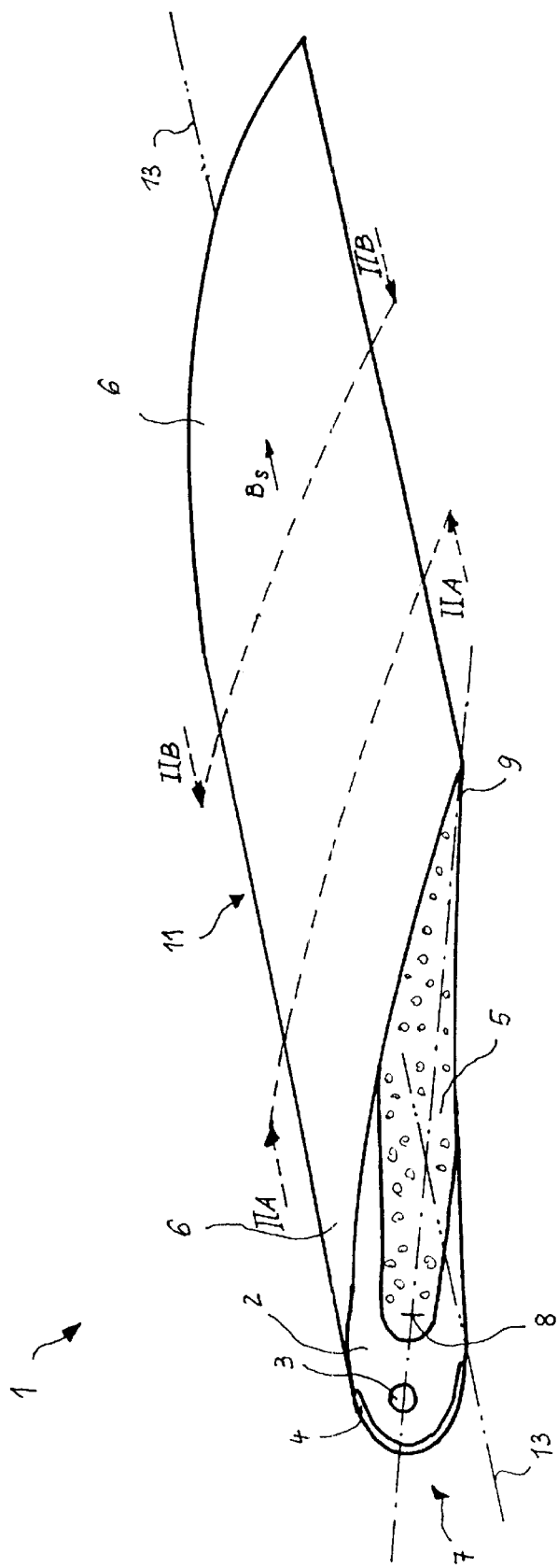
FIG. 1 is a cross-sectional perspective view of a typical profile of a lift-generating blade of a rotor blade arrangement of a rotary wing aircraft.

FIG. 1 shows a typical profile of a lift-generating blade 1. In general the profile shows the structure of the blade including a roving spar 2, with a balancing weight 3 close to the leading edge or nose 7, and with a rigid foam core 5 after or behind the roving spar 2. A roving consists of fiber strands formed of synthetic long filaments. Both the roving spar 2 and the rigid foam core 5 are jointly surrounded by an outer skin or shell 6 of fiber reinforced plastic. The shell 6 forms the cross-section contour. It must therefore satisfy high demands with regard to profile accuracy, surface quality, and protection against wear and impact damage as well as dents. In the area of the leading edge 7, the shell 6 is covered by an edge shell or nose shell 4 as protection against erosion. The trailing edge region with the profile trailing edge 9 is situated diametrically opposite the leading edge 7. The blade structure is formed during blade construction. Due to aeroelastic demands, the center of gravity 8 of the profile cross-section must be arranged at approx. 25% of the profile chord, measured from the leading edge 7.

Figure 2:
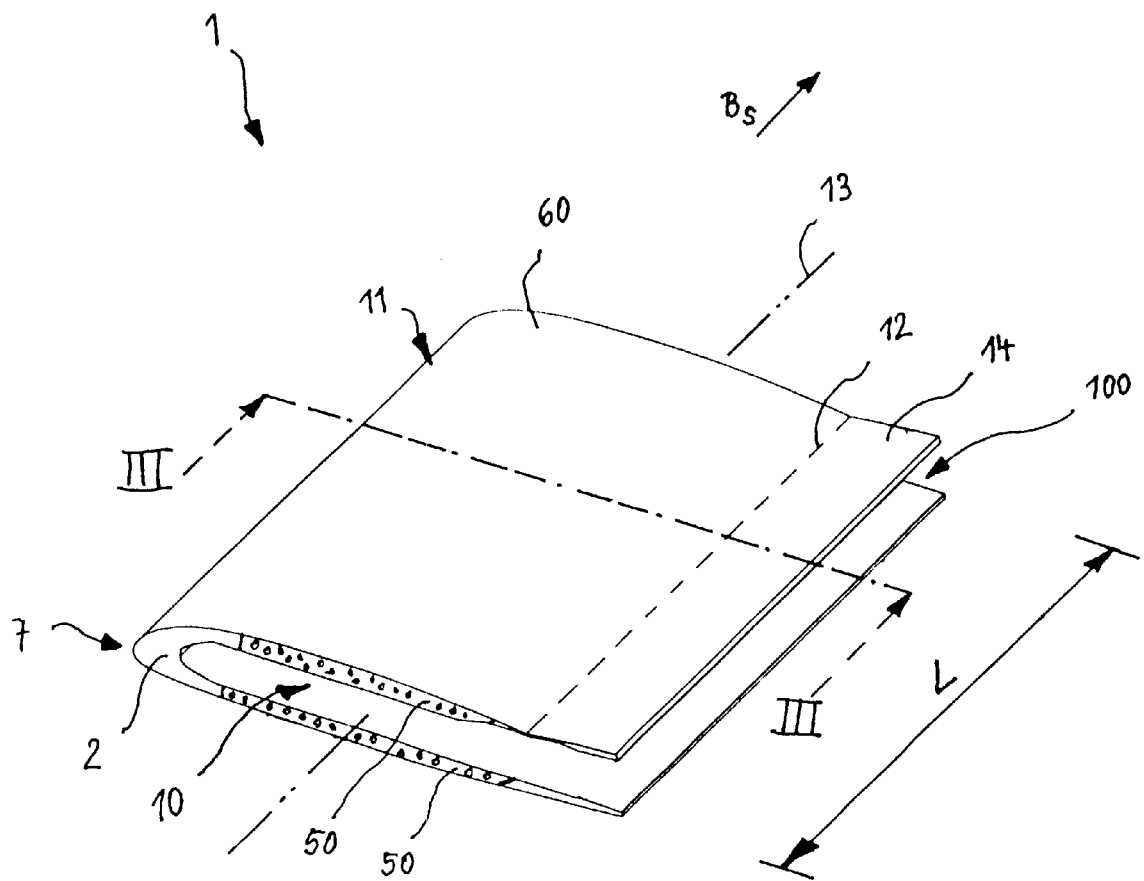
FIG. 2 is a sectional perspective view of a blade section cut out from the lift-generating blade between the lines IIA—IIA and IIB—IIB in FIG. 1.

If two sections are cut through the blade 1 perpendicularly to its longitudinal blade axis 13, respectively along section lines IIA—IIA and IIB—IIB, this creates a blade cut out 11. FIG. 2 shows such a blade cut out 11 from the lift-generating blade 1. To aid comprehension of the invention, this blade cut out 11 is described in the following. A cavity forming a blade chamber 10 can be discerned in the blade cut out 11. Both sections IIA—IIA and IIB—IIB were located in such a way that they are situated exactly along the lateral cavity boundaries, thus allowing the cavity to be illustrated in its entire length L. The depth of the cavity can extend within the blade interior from the area of the trailing edge forward to the roving spar 2.

The cavity is arranged in the inner blade structure, preferably close to the outboard blade tip $B_s$. Due to a gap or a missing portion of the profile trailing edge 9 at this area, the cavity has an opening 100 in the direction of the missing profile trailing edge (i.e. in the gap of the trailing edge). This cavity with opening 100 is described as blade chamber 10. The blade chamber 10 is essentially formed in that structural area of the blade 1, which was originally formed of the rigid foam core 5. In other words, the foam core 5 is omitted here. This can be achieved during original manufacturing or in a later retro-fitting of the rotor blade 1. The shell 60 in the area of the opening 100 is perceptibly reinforced in the direction of the profile interior. A bending hinge 12 is formed at the top side of the shell in the area of the opening 100. Instead it could be provided on the bottom side of the shell 60. This bending hinge 12 essentially extends parallel to longitudinal blade axis 13. The bending hinge is formed of the fiber composite material structure, thus this section forms the top side of the shell 60 as a bending cover 14. The blade chamber 10 serves for the later accommodation of a housing of a flap module to be inserted therein.

Figure 3:
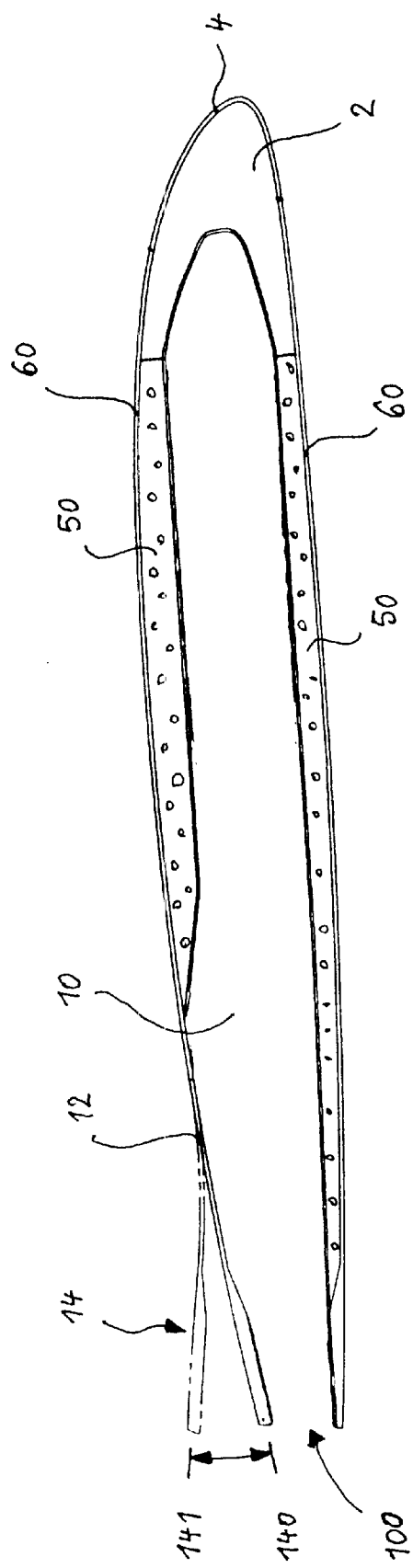
FIG. 3 is a cross-section taken along the line III—III in FIG. 2, showing a bending cover of the blade.

FIG. 3 shows the function of the bending cover 14 along the section line III—III from FIG. 2. The bending cover 14 is thus a part of the shell 60, the supporting structure, and can be deflected or pivoted from a resting position 140 around the bending hinge 12 into an end position 141 and can reset itself into the resting position 140 due to its elastic recovery. By manually pivoting the bending cover 14, the opening 100 can be enlarged if a force is applied for example up to the height of the internal height of the blade chamber 10. Only when the bending cover 14 opens or clears the maximum opening of the blade chamber 10 by manually bending it into its end position 141, then a housing of a flap module can be inserted in or removed from the blade chamber 10. In the resting position 140 of the bending cover 14, this perceptibly diminishes the size of the opening 100, so that in this condition no insertion or removal of a housing would be possible. In the resting position 140 condition of the bending cover 14 it is, however, possible to locally press down the shell 60 of the blade to the level of the required contour, and thus guarantee a harmonious profile course. The required profile contour is achieved when the bending cover 14 in the resting position 140 fits closely on the level of a bearing bar for the flap, as will be described below.

The cavity for the blade chamber 10 is also taken into consideration and formed at the same time as the manufacture of the rotor blade or is formed later in a retro-fit procedure as mentioned above. The blade chamber 10 is bounded by sections of the shell, sections of the rigid foam core and the roving spar.

FIG. 4 and FIG. 4a show the insertion of a housing 16 of a flap module in the blade chamber 10. The bending cover 14 is subjected to pre-tensioning in the end-position 141 and the opening 100 is enlarged, thus allowing a housing 16 to be inserted in the blade chamber 10. The blade chamber 10 is geometrically formed in such a way that it can position the housing 16 to be accommodated there. The blade chamber 10 forms a defined guide for the housing in the direction of height. In the direction of insertion, positioning is achieved via a fastening means, e.g. fitting screws, which can be guided through aligned holes in the shell as well as the housing.

The housing 16 can (as illustrated) be inserted until it contacts the forward boundary of the blade chamber 10 and is thereby positively positioned. However, that is not absolutely necessary. Instead, a gap can remain between a front wall 160 of the housing 16 and a front stop wall 15 of the blade chamber 10. The wall of the blade chamber 10 can for example be fabricated of a rigid carbon fiber reinforced plastic composite (CFC).

The housing 16 can be formed in the same way as shown in FIG. 4, i.e. so that its contour essentially adjusts to interlock with the wall of the blade chamber 10. The housing 16 is completely inserted (FIG. 4a) if for example the front wall 160 of the housing interlocks in contact with the stop wall 15 of the blade chamber. The bending cover 14 resets itself into the resting position 140 and interlocks or abuts in a form-fitting manner closely with the housing. It secures the housing in case of a resting rotor blade.

When the housing 16 is accommodated by, i.e. received in, the blade chamber 10, then the flap 17 juts out from the blade chamber 10. In so doing, the housing 16 completely seals off the opening 100 of the blade chamber 10 with a sealing means 141 (e.g. a seal element such as a seal member or sealing compound). The flap 17 is arranged to move freely pivotally relative to the housing 16 and the flap cross-section contour corresponds to a continuation of the interrupted profile blade contour, thus guaranteeing a completely aerodynamic blade profile. Advantageously the flap trailing edge essentially forms a section of the profile trailing edge 9 of blade 1.

The housing 16 can thus be inserted and removed from the position of the original blade trailing edge 9 in a direction perpendicular or crosswise relative to the longitudinal blade axis 13 within the structure of the blade 1, if its fastening means is released. The housing 16 can be fabricated of carbon fiber reinforced plastic to achieve a low weight in combination with the demanded high level of rigidity. This demand is necessary in order to withstand the great strain caused by the centrifugal force.

The housing 16 fulfills several functions. The housing 16 basically accommodates or houses and supports a flap drive and the flap. The flap drive comprises at least one actuator with a movable hinged frame or linkage and appropriate power transmission means connecting the actuator to the flap. Also, the housing 16 both supports and bears the assemblies of the flap drive and the flap via a bearing bar. The housing 16 including the flap drive and the flap can be described as a "flap module". The housing 16 further serves to support a pre-tensioning means for a piezoelectric actuator of the flap drive.

The housing is essentially formed in such a way that it replaces the missing material substance (essentially rigid foam) in the blade chamber. The decisive advantage is, however, the fact that the supporting blade structure is not disturbed. Thus, the torsional rigidity and strength of the blade 1 in its original dimensioning are not affected. That is a big advantage in comparison with the prior art.

By appropriately controlling the actuator in any known manner by any conventional means, the actuator causes a targeted flap adjustment of the flap 17, which in turn counteracts various undesired motions of the rotor blade 1, such as the lead-lag pivoting thereof. The conventional vibration dampers or snubbers in the rotor blade cannot be completely dispensed with, but they can be made smaller, lighter and more economically in view of the effects of the flap. The operating details and mechanisms of the flap and the flap drive are not limited by the present invention and can be according to any conventional teachings.

The height of the housing remains smaller than its length or width, thus guaranteeing a low installation height.

Figure 5:
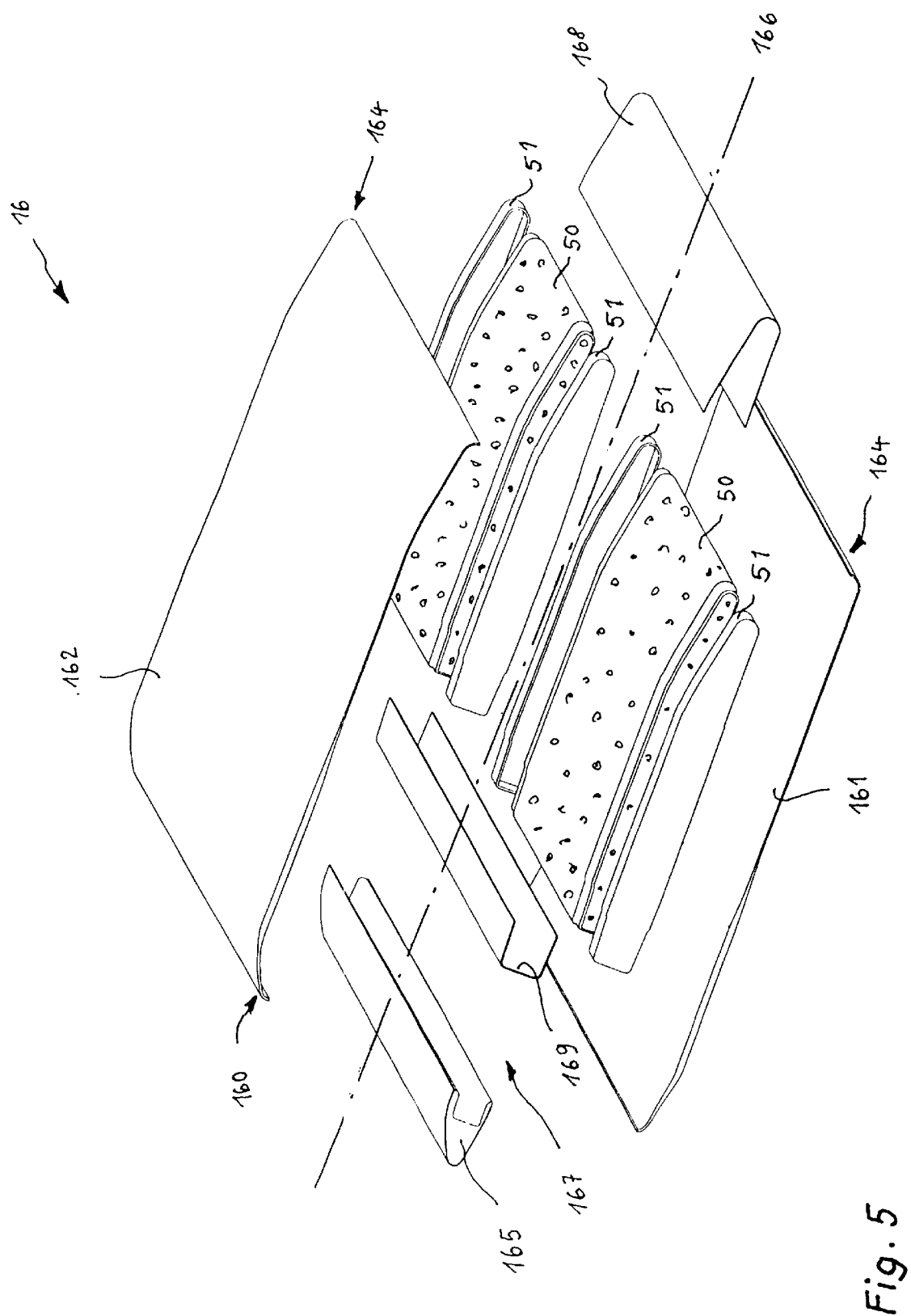
FIG. 5 is an exploded view of the housing components of the housing of the flap module.

FIG. 5. shows the components of the housing 16. The housing 16 is formed of a base wall 161 and a covering wall 162. They form the bottom base surface and the top covering surface respectively of the housing 16. In the illustration the boreholes and cut outs, to be described below, are still missing. The base wall 161 and the covering wall 162 are only connected to each other at two opposing sides each. The connections of the two walls are situated opposite to each other. The connection between base wall 161 and covering wall 162 forms a profile curvature for example. This profile curvature furthers or beneficially facilitates the insertion of the housing 16 into the blade chamber 10.

The wall connection between the base wall 161 and the covering wall 162 which can, for example, be formed as a profile curvature and should be inserted first into the blade chamber, is described as the front wall 160. The rear wall 164 opposite the front wall 160, serves to accommodate a bearing bar for the flap 17.

When the housing 16 is arranged and received in the blade chamber 10, the center of gravity position of the housing 16 may not detrimentally influence the original center of gravity position 8 of the blade 1. Thus, the center of gravity of a profile cross-section through the blade and the inserted flap module should be identical or nearly identical (e.g. within ±5% of the profile chord) to the center of gravity of a profile cross-section of the blade at an area without the blade chamber and flap module. Ideally, the center of gravity of the blade profile cross-section must remain arranged at e.g. 25% of the profile chord, measured from the leading edge, after installing the flap module therein. Under this aspect the front wall 160 of the housing 16 should be positioned as close as possible to roving core 2 in its end position. The other built-in housing components must also satisfy these demands of the center of gravity. The housing 16 according to the invention thus advantageously supports the center of gravity position of the blade 1.

The volume in the front third of the housing encompassed by the base wall 161, the covering wall 162 and the front wall 160 is formed in the area of the curved front wall by a leading edge spar 165. This leading edge spar 165 consists of a carbon fiber reinforced laminate with unidirectional oriented fibers. This leading edge spar must also be able to withstand bending strains. The following or downstream housing volume in the direction of the longitudinal housing axis 166 (parallel to the forward-rearward direction of the blade) forms a clearance or hollow space 167. The volume of housing 16 connected to clearance 167, for example ⅔ of the total housing volume, is filled with rigid foam 50. The rigid foam 50 is held by two caps 168 and 169. The rigid foam 50 forms a lateral boundary or lateral wall between base wall 161 and covering wall 162, as does the leading edge spar 165. These lateral walls formed by the leading edge spar 165 and the rigid foam 50 preferably serve to laterally guide the housing 16. The side walls restricting the rigid foam 50, also known as bridges 51, consist of carbon fiber reinforced laminate. These bridges 51 of CFC laminate reinforce the housing 16 in the direction of the axis 166 and form a termination or side boundary to the rigid foam 50.

Figure 6:
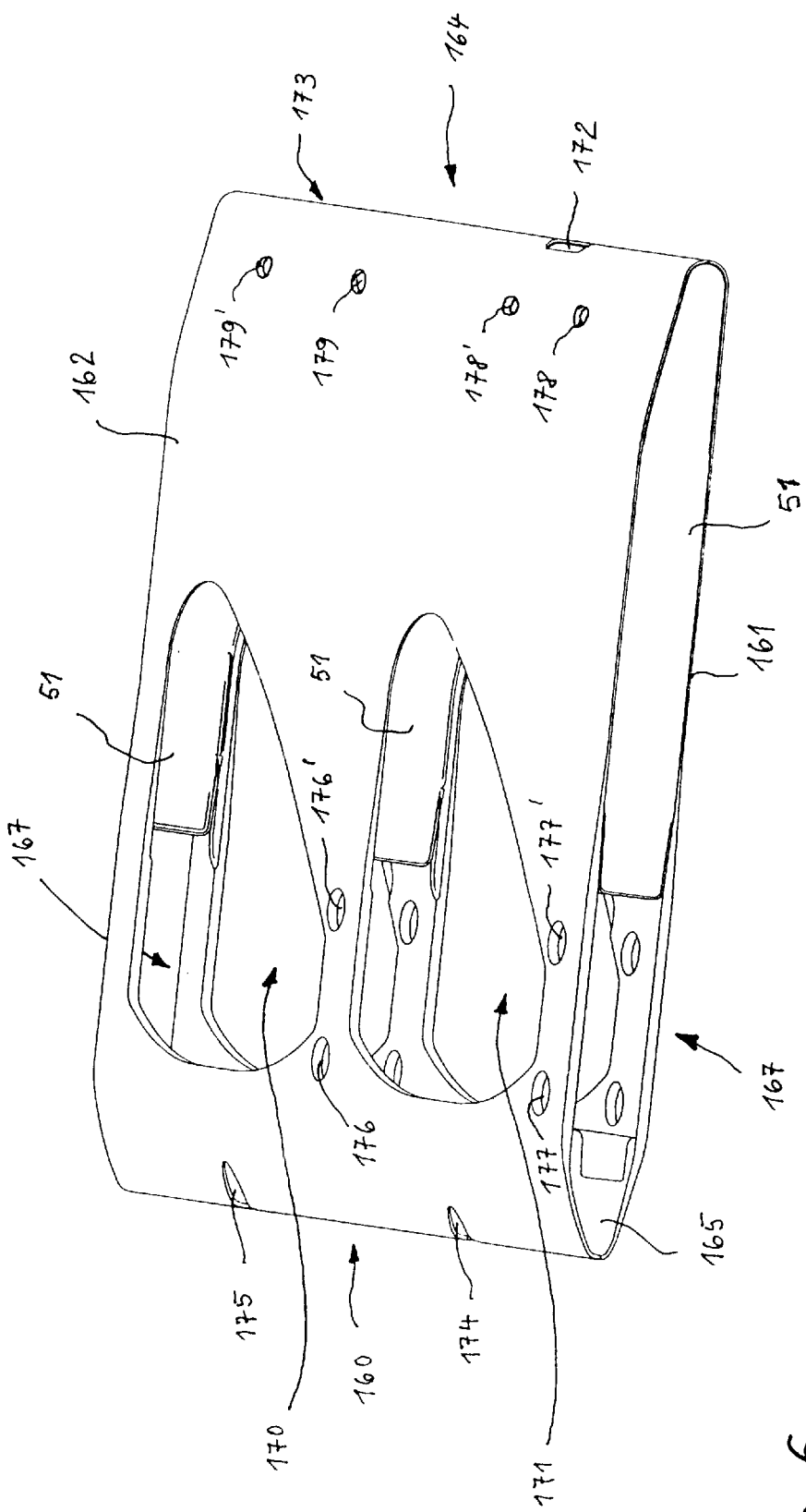
FIG. 6 is a perspective view of the housing without either the flap drive or the flap.

FIG. 6 shows a perspective view of the housing without either the flap drive or the flap. Base wall 161 and covering wall 162 each have two openings in the area of the clearance 167. These are the cut outs 170, 171. On the rear wall 164, two slits 172, 173 are provided, which allow the passage of power transmission means from the flap drive to the flap. The front wall has two boreholes 174, 175 therein. They serve to accommodate pre-tensioning means for the flap drive. The walls 161, 162 also have boreholes 176, 176', 177, 177'. They serve both to fasten the flap drive to the housing and to fasten the housing to the blade structure. The boreholes 178, 178', 179, 179' serve to fasten a bearing bar which carries the flap as well as to fasten the housing to the blade.

Figure 7:
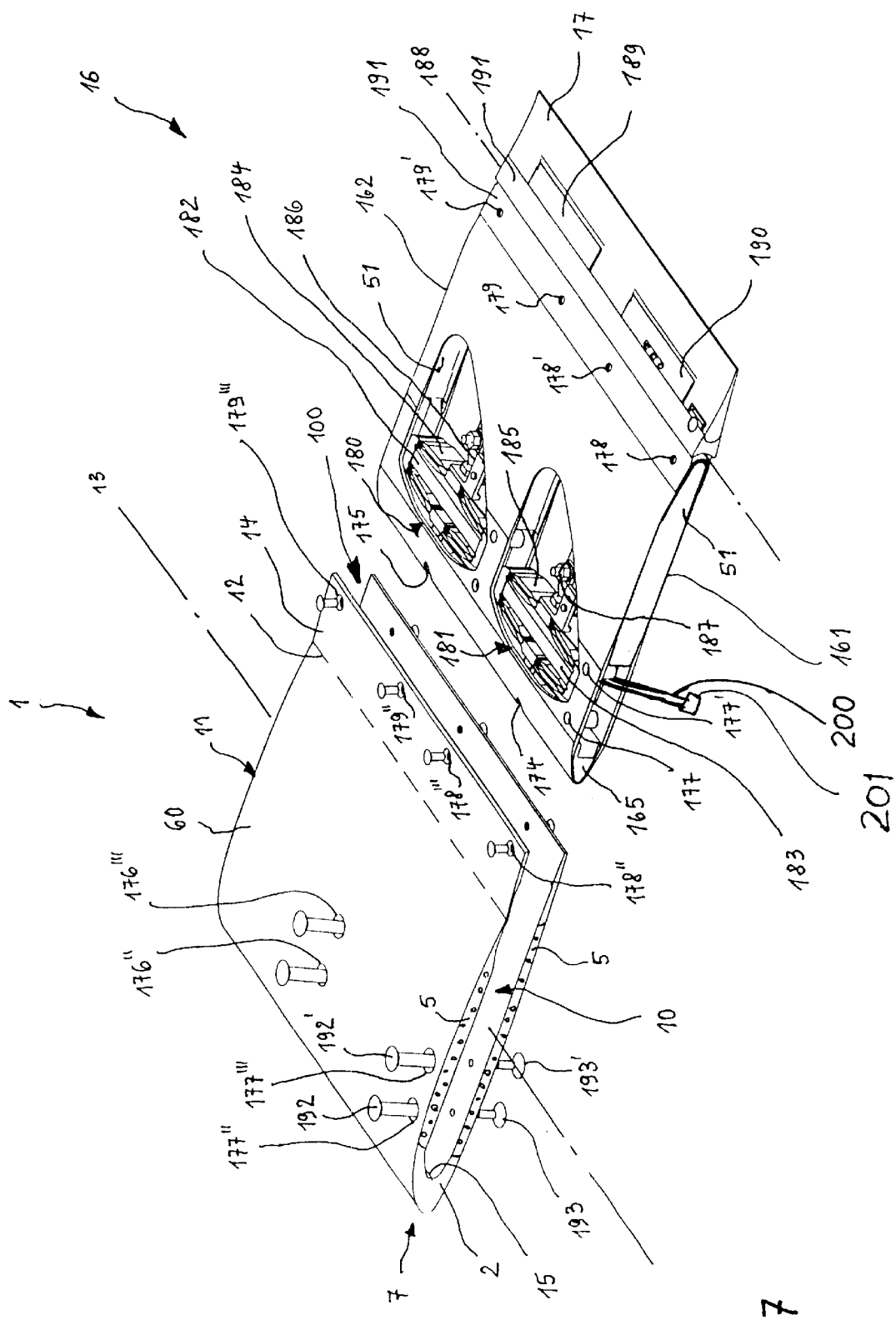
FIG. 7 is a perspective view of the housing with both the flap drive and the flap for insertion into the blade chamber.

FIG. 7 shows a housing 16 with flap drives 180, 181 and a flap 17 for insertion into the blade chamber 10 of the blade 1. Via the cut outs 170, 171 a respective flap drive 180, 181 can be inserted and fixed to the walls of the housing 16. The flap drive can for example comprise a piezoelectric actuator 182, 183, which is connected with a hinged linkage or transmission mechanism, for example a hinged frame 184, 185, which includes formed power transmission means 186, 187, which can be connected with the flap 17. To this end the housing 16 has two slits 172, 173 (see FIG. 6) at its curved rear wall, which allow the passage of power transmission means 186, 187 (e.g. connecting rods) to the flap 17 and which are displaced with respect to each other in relation to the flap axis 188.

The two connecting rods or tension rods as part of the power transmission means 186, 187 are connected to the flap eccentrically to the flap axis 188 in a bearing housing 189, 190, and are each held by a tie shaft mounted in the bearing housing. The two bearing housings 189, 190 each contain tie rods, bearings, sealing rings and thrust washers for the centrifugal force support of the tie shafts (not illustrated). The two bearing housings 189, 190 are for example adhered to the flap 17 by an adhesive. The flap 17 is manufactured of carbon fiber reinforced plastics due to the demand for a level of high rigidity at a low weight. The flap axis 188 is accommodated by the bearing bar 191. Thus the bearing bar 191 has a hinge function.

The two flap drives 180, 181 can be installed for example in the clearance 167. They can be inserted in the housing 16 through the cut outs 170, 171 of the wall during assembly. They can be positioned and fixed in the housing 16 and, if necessary, can also be detached and removed again. The actuating power or force developed by the flap drives 180, 181 is transmitted via power transmission means 186, 187 which can move unrestrictedly when guided in existing channels in the rigid foam 50 and can pass through the slits 172, 173 (FIG. 6) via the bearing bar 191 and be connected with the bearing housing 189, 190 of the flap 17.

The housing 16 has fastening means to fasten the flap drive. To this end, the hinged frame of the actuator has two fastening straps or brackets. For example, a hinged frame and its associated actuator can be fastened by two screws 193, 193' cooperating with threaded sleeves 192, 192', wherein the screws 193, 193' and the threaded sleeves 192, 192' support themselves on the shell 60 of the supporting structure of the blade 1. An analogous procedure applies to the neighboring hinged frames. Thereby, the flap module is also secured in the blade chamber 10 of the blade 1.

In the curved front wall 160 of the housing 16, boreholes 174, 175 are provided through the leading edge spar 165. This applies to one borehole per flap drive. A pre-tensioning screw extends through such a borehole 174, 175, supports itself on the shell 60, is accommodated by the hinged frame of the actuator and allows a pre-tensioning of the actuator. Via this so-called pre-tensioning screw, the actuator can be pre-tensioned against the housing resistance. This pre-tensioning of both piezoactuators is achieved before the blade 1 accommodates the housing 16. The pre-tensioning screw allows the desired adjustment of the actuator.

The housing 16, beginning with the front wall 160 thereof, is inserted in the blade chamber 10 perpendicularly or crosswise relative to the longitudinal blade axis 13. The walls of the housing 16 thus function as a guiding means. The front wall 160 of the housing 16 is guided into the blade chamber 10 until it contacts the front stop wall 15. The housing 16 is then fastened in the blade chamber 10 as described above.

Via the screw connection (in the boreholes 176, 176', 176'', 176''' and 177, 177', 177'', 177''') of the actuators, the housing 16 is also pre-tensioned with the blade chamber 10 (FIG. 7), so that the housing 16, the so-called flap module, is firmly connected with the rotor blade 1. Furthermore, (FIG. 7) the flap module is screwed together with the bearing bar 191 in the area of the bending cover 14. In each housing 16 it is possible, for example, to screw together four screws or threaded sleeves on the upper side and four threaded sleeves or screws on the lower side into the boreholes 178'', 178''', 179'', 179''' of the blade 1 with the boreholes 178, 178', 179, 179' of the bearing bar 191.

As the actuator is to be electrically controlled, electrical power supply and information (e.g. control and feedback data) lines 200 must also be provided and connected via an electrical connection 201 at the housing. The connector 201, e.g. a suitable electrical connector plug, is connected to further power supply and information lines that are guided through the rotor blade and the hollow rotor shaft to a control device.

The inventive flap module can be removably integrated into every known conventional rotor blade, either at the time of original manufacture thereof or by a later retrofitting. Advantageously, the flap module already allows exchangeability at the customer's location, thus avoiding the need for exchanging flaps or flap drives at the manufacturer's location. An additional advantage of the flap module is that it has a low weight and does not detrimentally influence the center of gravity position of the blade. The blade chamber can be sealed with respect to the blade so that no foreign particles or humidity can penetrate the blade chamber.

Figure 8:
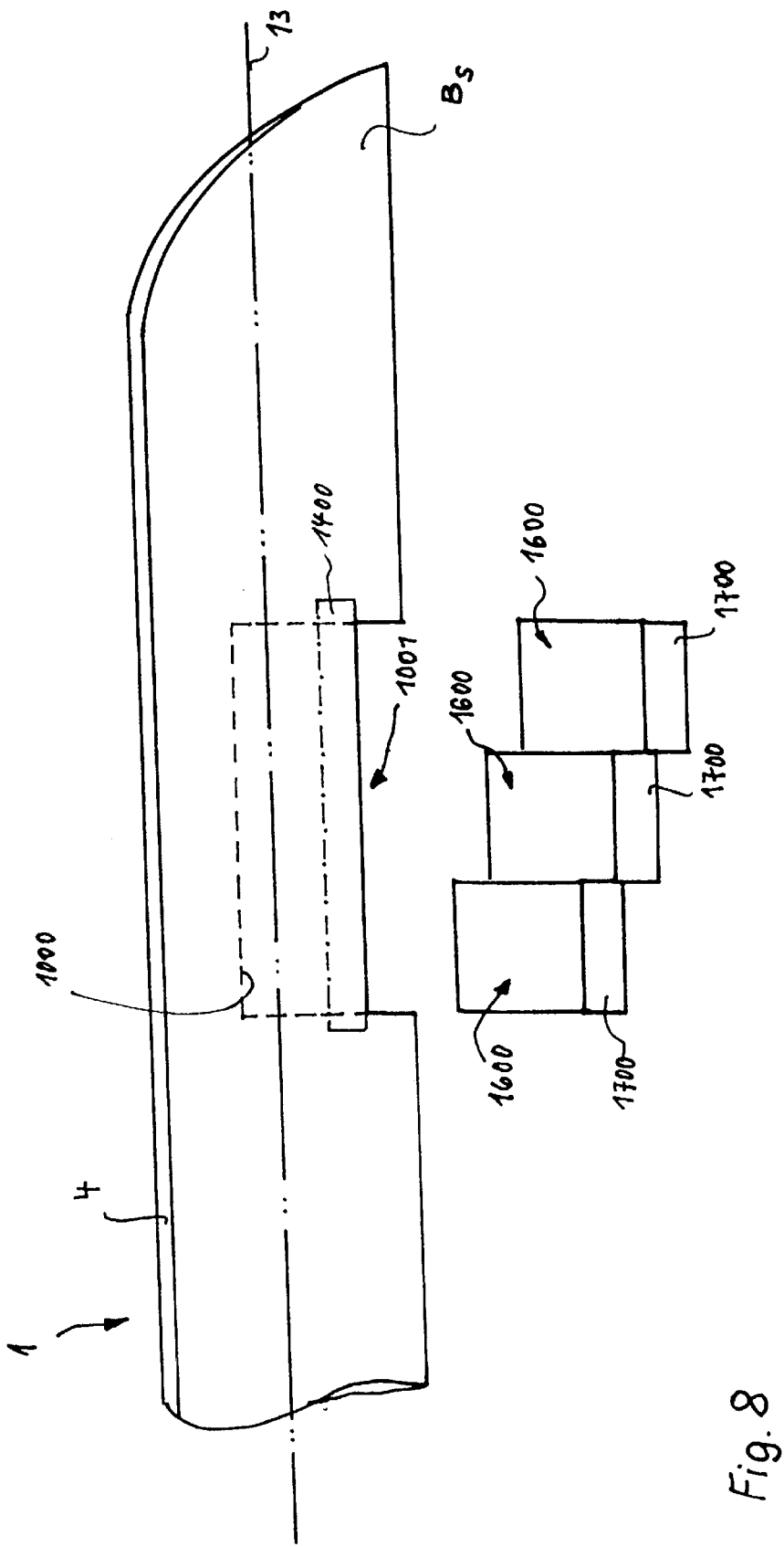
FIG. 8 schematically shows several flap modules arranged on one level or plane, respectively next to each other, for insertion into the blade chamber.

The invention also makes it possible (FIG. 8) to insert several flap modules 1600 next to each other on one level or plane in order to increase the aerodynamic flap efficiency. A prerequisite of this is that the blade chamber 1000 is sufficiently dimensioned. For example, three geometrically identical flap modules 1600 can be inserted, thus increasing the effective length of the entire flap. In so doing, the flap position of the three individual flaps 1700 relative to the housing remains identical. The bending cover 1400 is integrated into the blade over all of the flap modules, in order to assemble or dismantle the individual flap modules with respect to the blade. The insertion of the modules 1600 in the opening 1001 begins advantageously with one of the laterally outer modules, wherein the middle module can use the lateral surfaces of the neighboring module as a guide surface. The bearing bar and the flap of each of the three individual flap modules 1600 assume the continuation of the blade contour in the trailing edge region.

The invention is not restricted to a flap module that can be used in the trailing edge of a blade. It is also possible that a section of the leading edge of the rotor blade can be formed as a flap, a so-called leading edge or nose flap. By means of a movable, controllable leading edge flap, the lift of the blade can also be specifically influenced. Such a leading edge flap also needs associated assemblies such as a leading edge flap drive, power transmission means as well as the connection with a control unit. The invention also encompasses the above described flap module being embodied as a leading edge flap module. An appropriate blade chamber with an opening is also required. The opening in this case is oriented in the forward direction of the original leading edge. An original section of the leading edge is removed to form a gap, and is replaced by the movable leading edge flap of the leading edge flap module. The construction and arrangement of the leading edge flap module corresponds to the trailing edge flap module described above, except that it is accommodated in the leading edge area rather than the trailing edge area of the blade.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims.

What is claimed is:

1. A rotor blade arrangement comprising:
   a rotor blade having a blade chamber therein and an opening that communicates from said blade chamber to an exterior of said rotor blade; and
   at least one flap module respectively including a module housing, a flap connected to and extending from said module housing, and a flap drive accommodated in said module housing and connected to said flap;
   wherein said flap module is arranged with said module housing inserted through said opening and at least partly received and releasably secured in said blade chamber, and with said flap protruding out of said rotor blade.

2. The rotor blade arrangement according to claim 1, wherein said rotor blade has a leading edge oriented in a forward direction and a trailing edge oriented in a rearward direction, said opening is oriented in said rearward direction, and said flap is a trailing edge flap.

3. The rotor blade arrangement according to claim 2, wherein said blade has a gap in said trailing edge at an area in said rearward direction from said blade chamber, said opening passes in said rearward direction from said blade chamber outwardly through said area of said gap, and said trailing edge flap is arranged in said gap as a movable continuation of said trailing edge of said rotor blade.

4. The rotor blade arrangement according to claim 1, wherein said rotor blade has a leading edge oriented in a forward direction and a trailing edge oriented in a rearward direction, said opening passes in said forward direction from said blade chamber outwardly from said rotor blade, and said flap is a leading edge flap.

5. The rotor blade arrangement according to claim 4, wherein said leading edge flap adjoins said leading edge of said rotor blade and forms a movable continuation of said leading edge of said rotor blade.

6. The rotor blade arrangement according to claim 1, wherein said rotor blade comprises an outer skin including a main shell and an elastically deflectable cover that is elastically deflectably connected to said main shell along a bendable hinge with a hinge axis extending parallel to a longitudinal blade axis of said rotor blade, and that extends from said main shell to deflectably bound said opening.

7. The rotor blade arrangement according to claim 6, wherein said elastically deflectable cover is pivotable relative to said main shell along said bendable hinge from a resting position to a deflected position so as to enlarge an opening size of said opening, and from said deflected position to said resting position so as to reduce said opening size of said opening.

8. The rotor blade arrangement according to claim 1, wherein said rotor blade comprises a structure including internal boundary walls that bound said blade chamber and that form a guide that guidingly receives said module housing inserted therein.

9. The rotor blade arrangement according to claim 1, wherein said flap drive comprises a piezoactuator.

10. The rotor blade arrangement according to claim 9, wherein said flap module further includes a pre-tensioning device supported on said module housing and acting on said piezoactuator to pre-tension said piezoactuator.

11. The rotor blade arrangement according to claim 1, wherein said flap drive comprises an electromechanical actuator and a linkage that connects said electromechanical actuator with said flap.

12. The rotor blade arrangement according to claim 1, further comprising at least one removable fastener that releasably secures said module housing in said blade chamber.

13. The rotor blade arrangement according to claim 12, wherein said removable fastener comprises an internally threaded sleeve and an externally threaded bolt that is engaged in said internally threaded sleeve.

14. The rotor blade arrangement according to claim 12, wherein said at least one removable fastener includes a fastener that passes through aligned holes in said module housing, said flap drive and said rotor blade and that releasably secures said module housing in said blade chamber and simultaneously releasably secures said flap drive in said module housing.

15. The rotor blade arrangement according to claim 12, wherein said flap module further includes a bearing bar that extends along a longitudinal edge of said module housing and connects said flap with said module housing, and wherein said at least one removable fastener includes a fastener that passes through aligned holes in said rotor blade, said module housing, and said bearing bar, and that releasably secures said module housing in said blade chamber and simultaneously releasably secures said bearing bar to said module housing.

16. The rotor blade arrangement according to claim 1, wherein said module housing includes an outer shell wall having a hollow space therein and having at least one access opening therein through which said flap drive can be accessed and installed in and removed from said hollow space in said module housing.

17. The rotor blade arrangement according to claim 1, wherein said flap module further includes a seal element that is provided on said module housing and that forms a seal against said rotor blade to seal said opening.

18. The rotor blade arrangement according to claim 1, further comprising a power cable and a data cable arranged inside said rotor blade, and wherein said flap module further includes a power conductor line and a data conductor line and at least one connector that connects said power conductor line to said power cable and connects said data conductor line to said data cable.

19. The rotor blade arrangement according to claim 1, wherein said rotor blade further has a blade portion that is longitudinally displaced next to said blade chamber and does not have said blade chamber extending into said blade portion, wherein a first profile cross-section of said blade portion without said blade chamber on a first section plane that passes through said blade portion normal to a longitudinal axis of said rotor blade has a first center of gravity, wherein a segment of said rotor blade with said flap module arranged in said blade chamber is defined between two section planes that extend parallel to said first section plane along boundaries of said blade chamber, wherein said segment includes the entirety of said flap module arranged in said blade chamber, and wherein said segment has a second center of gravity that is identical to or nearly identical to said first center of gravity in a front-to-rear direction of said rotor blade perpendicular to said longitudinal axis.

20. The rotor blade arrangement according to claim 19, wherein said rotor blade includes a blade spar along a leading edge of said rotor blade, said module housing includes a housing leading edge spar arranged adjacent and parallel to said blade spar in said blade chamber, and said second center of gravity is arranged in or near said housing leading edge spar.

21. The rotor blade assembly according to claim 1, wherein said at least one flap module comprises a plurality of said flap modules which are arranged laterally adjacent to one another in a direction parallel to a longitudinal axis of said rotor blade on a single level in said blade chamber.

* * * * *